United States Patent
Pavlik (10) Patent No.: US 9,285,291 B2
(45) Date of Patent: *Mar. 15, 2016

(54) TEST SYSTEM AND METHOD FOR FLEXIBLE CONTAINERS

(71) Applicant: ADVANCED SCIENTIFICS, INC., Millersburg, PA (US)

(72) Inventor: Rudolf Pavlik, Millersburg, PA (US)

(73) Assignee: Advanced Scientific, Inc., Millersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,771

(22) Filed: Aug. 23, 2013

(65) Prior Publication Data

US 2014/0083169 A1    Mar. 27, 2014

Related U.S. Application Data

(63) Continuation of application No. 13/615,935, filed on Sep. 14, 2012, now Pat. No. 8,534,120.

(51) Int. Cl.
*G01M 3/32*    (2006.01)

(52) U.S. Cl.
CPC .......... *G01M 3/3218* (2013.01); *G01M 3/3263* (2013.01)

(58) Field of Classification Search
CPC .................. G01M 3/3218; G01M 3/3263
USPC ............................. 73/40, 49.2, 49.3
See application file for complete search history.

(56) References Cited

U.S. PATENT DOCUMENTS

| | | |
|---|---|---|
| 3,762,212 A | 10/1973 | Morley et al. |
| 3,800,586 A | 4/1974 | Delatorre et al. |
| 4,055,984 A | 11/1977 | Marx |
| 4,205,551 A | 6/1980 | Clifford et al. |
| 4,350,038 A | 9/1982 | Soncrant |
| 4,588,085 A | 5/1986 | Sussman |
| 4,715,214 A | 12/1987 | Tveter et al. |
| 5,111,684 A | 5/1992 | Stauffer et al. |

(Continued)

FOREIGN PATENT DOCUMENTS

| | | |
|---|---|---|
| DE | 3340353 A1 | 5/1985 |
| EP | 1616938 A2 | 1/2006 |

(Continued)

OTHER PUBLICATIONS

*ASTM—Standard Test Method for Measuring Package and Seal Integrity Using Helium as the Tracer Gas*, Reapproved 2011, 8 pgs.

(Continued)

*Primary Examiner* — Daniel S Larkin
(74) *Attorney, Agent, or Firm* — Workman Nydegger (57) ABSTRACT

A portable test device and related method are disclosed for conducting integrity testing of flexible containers. The test is particularly useful for testing aseptic flexible film bags in a manner that maintains the sterile nature of the container and removes crinkles by inflating the containers to remove crinkles and establish an inflation set point. The decay in pressure is measured over a predetermined period of time; if pressure loss does not exceed a predetermined threshold the integrity of the bag is confirmed and it can be filled without further manipulation of the container that may result in introducing flaws.

19 Claims, 4 Drawing Sheets

(56) References Cited

U.S. PATENT DOCUMENTS

| | | |
|---|---|---|
| 5,205,157 A | 4/1993 | McDaniel |
| 5,287,729 A | 2/1994 | Lehmann |
| 5,386,717 A | 2/1995 | Toda |
| 5,513,516 A | 5/1996 | Stauffer |
| 5,591,899 A | 1/1997 | Griesbeck |
| 5,728,929 A | 3/1998 | Gevaud |
| 5,767,391 A | 6/1998 | Wong |
| 5,907,093 A | 5/1999 | Lehmann |
| 6,305,215 B2 | 10/2001 | Lehmann |
| 6,308,556 B1 | 10/2001 | Sagi et al. |
| 6,460,405 B1 | 10/2002 | Mayer et al. |
| 6,842,955 B2 | 1/2005 | Joshi et al. |
| 7,076,993 B2 | 7/2006 | Cook |
| 7,308,819 B2 | 12/2007 | Kamio et al. |
| 7,313,944 B2 | 1/2008 | Lehmann |
| 7,516,648 B2 | 4/2009 | Terentiev |
| 7,559,231 B2 | 7/2009 | Kanematsu et al. |
| 8,910,509 B2 | 12/2014 | Terentiev et al. |
| 2004/0081601 A1 | 4/2004 | Morrissey et al. |
| 2005/0247110 A1 | 11/2005 | Sagi et al. |
| 2006/0179922 A1 | 8/2006 | Sacca |
| 2006/0277975 A1 | 12/2006 | Barcan |
| 2007/0113621 A1 | 5/2007 | Kanematsu |
| 2008/0213874 A1 | 9/2008 | Mitchell et al. |
| 2008/0302443 A1 | 12/2008 | Martin |
| 2010/0326172 A1 | 12/2010 | Voute et al. |
| 2011/0011164 A1 | 1/2011 | Terentiev et al. |
| 2013/0047704 A1 | 2/2013 | Bae et al. |

FOREIGN PATENT DOCUMENTS

| | | |
|---|---|---|
| JP | 6011408 | 1/1994 |
| JP | 08-082568 | 3/1996 |
| WO | 91-16611 | 10/1991 |
| WO | 94/05991 | 3/1994 |
| WO | 98-54560 | 12/1998 |
| WO | 2009-145991 A1 | 12/2009 |

OTHER PUBLICATIONS

Contura Brochure, *Leak Testing of Flexible Packages*, INFICON the Instrumental Difference, at least as early as 2001, 6 pgs.

Dana Morton Guazzo, *Current Approaches in Leak Testing Pharmaceutical Packages*, PDA Journal of Pharmaceutical Science & Technology, vol. 50, No. 6, Nov.-Dec. 1996, pp. 378-385.

Jurgen Kossinna et al., *Helium Leak Testing of Packages for Oral Drug Products*, European Journal of Pharmaceutics and Biopharmaceutics, vol. 75, 2010, pp. 297-303.

Yasuhiro Miyako et al., *Helium Leak Test for Sterility Assurance of a Sealed Bag. I: Relationship of Helium Lean and Pinhole Diameter*, PDA Journal of Pharmaceutical Science and Technology, vol. 56, No. 5, Jul./Aug. 2002, pp. 183-191.

Yasuhiro Miyako et al., *Helium Leak Test for Sterility Assurance of a Sealed Bag. II: Establishing a Test Method for the Manufacturing Process*, PDA Journal of Pharmaceutical Science and Technology, vol. 57, No. 3, May/Jun. 2003, pp. 186-197.

Bradley D. Morrical et al., *Leak Testing in Parenteral Packaging: Establishment of direct Correlation Between Helium Leak Rate Measurements and Microbial Ingress for Two Different Leak Types*, PDA Journal of Pharmaceutical Science and Technology, vol. 61, No. 4, Jul./Aug. 2007, pp. 226-236.

Nicolas Voute, *PDA Web Seminars: Development and Validation of an Integrity Test Method for Large Volume 3D Bag Chambers*, Jul. 6, 2010, pp. 40.

LACO Technologies, Theory and Application: The Why, What, and How of Production Leak Testing, 2005, pp. 1-16, LACO Technologies, Inc., Salt Lake City, UT.

CTS Cincinnati Test Systems, Medical Bag & Bladder Leak Testing, pp. 1-2, www.cincinnati-test.com, Cleves, OH.

TEST SYSTEM AND METHOD FOR FLEXIBLE CONTAINERS

CROSS-REFERENCE TO RELATED APPLICATIONS

This patent application is a continuation of U.S. patent application Ser. No. 13/615,935, U.S. Pat. No. 8,534,120, filed on Sep. 14, 2012.

FIELD OF THE INVENTION

This invention relates to flexible containers and more particularly to a test system and method for evaluating the integrity of such containers.

BACKGROUND OF THE INVENTION

Flexible containers are commonly used for containment and delivery of medical fluids. These containers are generally single use bags manufactured from one or more types of plastic film that can be irradiated or otherwise withstand sterilization such that the container can be rendered aseptic. The containers are often used in life science applications and in the manufacture of pharmaceuticals to contain liquid raw materials prior to or during manufacture; in other cases such containers may be used to contain the finished product. The contents of these containers may be precious, particularly when used in large scale production. It is not unusual for even small containers to contain material worth many thousands of dollars.

Accordingly, it is beneficial to try to determine in advance whether the container may have an abnormality that might result in a rupture or other failure of the container that could lead to a loss of its contents.

One common solution employed for testing container integrity is to partially fill the container with helium, the container being placed within an enclosure along with a sensor able to detect the presence of helium. If helium is detected, a determination can be made whether there are any pores or pin holes not readily observable through which the helium is escaping.

Among the drawbacks to this methodology is that helium testers are generally large in size and expensive to operate. These systems require a ready source of helium that adds further expense and that also limits the available locations within a facility where that testing can take place. Furthermore, helium testing requires that the container be restrained, which requires additional valuable technician time. Yet another drawback is that silicon and other materials sometimes used in the manufacture of flexible containers are permeable to helium, making leak detection difficult and increasing the likelihood of false positives and the chance that a satisfactory bag will be needlessly discarded.

Even in situations where the container has no flaws from manufacture, they are shipped in a deflated or even evacuated state for convenience in shipping and storage. As the containers are filled, they expand as a result of the incoming fluid being pumped into the container. Filling is typically an automated process set to pump a pre-determined volume of fluid corresponding to the size of the container. However, the nature of the plastic used to form the containers is such that crinkles or other areas of self-adhesion may have developed during folding. This can result in a net decrease in the total volume of the container available for storage compared to the manufactured volume.

In many industrial settings, the containers may have a volume of several hundred or even a thousand or more liters. Thus, the weight of the container during filling can quickly become so heavy that manual manipulation to eliminate crinkles is impractical or impossible. In severe cases, the reduction in volume may be such that the volume of the liquid being pumped into the container exceeds the available container volume as a result of the crinkles to the point that the elasticity of the plastic is exceeded and the container bursts.

These and other disadvantages are found in known systems and methods for testing the integrity of flexible containers.

SUMMARY OF THE INVENTION

Exemplary embodiments provide a testing system and method for evaluating the integrity of flexible containers in place, allow for the use of air in conducting the tests that avoids the use of expensive helium testing systems, and which reduces or eliminates crinkles prior to filling the container with liquid to further reduce the risk of failure during filling.

According to an exemplary embodiment of the present disclosure, a method for testing the integrity of a flexible container comprises providing a deflated flexible container, inflating the flexible container with a sterile gas to reach a predetermined pressure within the flexible container, monitoring pressure within the flexible container for a predetermined period of time and comparing the pressure of the flexible container after the predetermined period of time to a predetermined set point.

In another embodiment, a portable flexible container integrity test device comprises a programmable logic controller (PLC), a pressure transducer in electronic communication with the PLC, a power source configured to provide electrical power to the PLC, a blower in electronic communication with the PLC, a gas delivery pathway in selective fluid communication with the blower, and a human/machine interface in electronic communication with the PLC. The device is portable and configured to fluidly connect to a flexible container via the gas delivery pathway.

One advantage of an embodiment of the present disclosure is that helium testing systems and their attendant trouble and expense can be avoided.

Yet another advantage of an embodiment of the present disclosure is that integrity testing can be performed on flexible containers using ordinary air.

Another advantage of an embodiment of the present disclosure is that the testing process is also useful to remove crinkles that may otherwise result in container failure during filling.

Yet another advantage of an embodiment of the present disclosure is that a portable device is provided for carrying out the integrity testing which decreases handling of the container and thus also decreases the possibility of introducing flaws that were not previously present.

Still another advantage of an embodiment of the present disclosure is that the container can be tested for leaks at the same location where it will be filled, reducing the likelihood that new leaks might be introduced during transport from the testing site to the filling site.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a portable test device and related method for conducting integrity testing of flexible containers and particularly for testing aseptic flexible film bags in a manner that maintains the sterile nature of the container while also overcoming drawbacks experienced with conventional testing and filling techniques.

Figure 1:
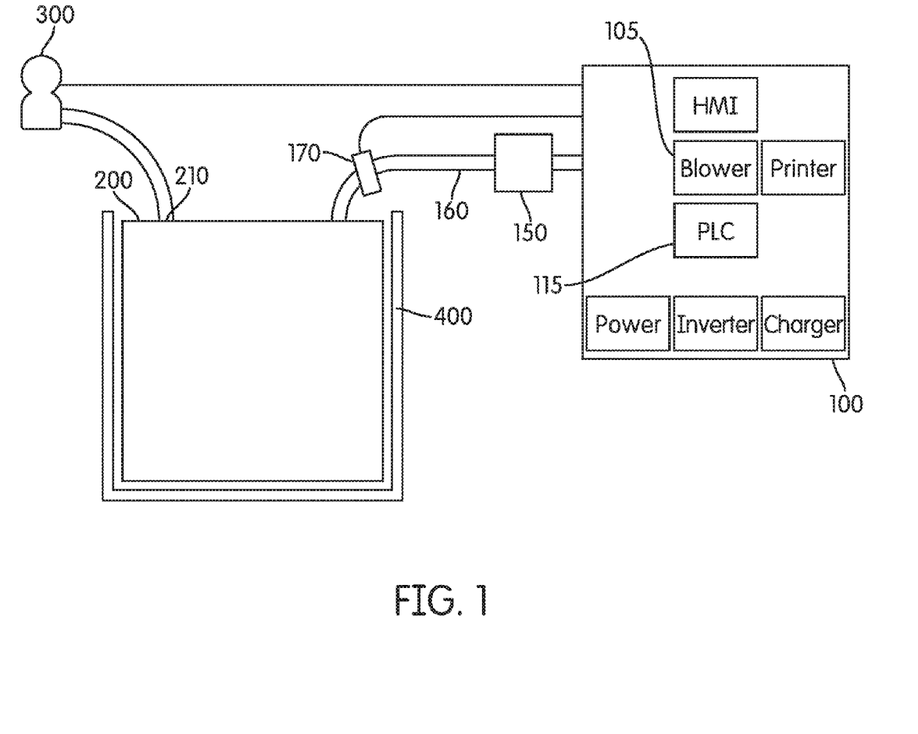
FIG. 1 is a schematic view of a test and filling station employing a portable flexible container integrity test device in accordance with an exemplary embodiment.

Turning to FIG. 1, an exemplary embodiment of the invention is schematically illustrated by positioning a portable flexible container integrity test device 100 in proximity to a flexible container 200 that is to be tested and subsequently filled with a liquid. As illustrated, the container 200 is filled by a pump 300, which is preferably a peristaltic pump 300 to permit an aseptic flow of the liquid into the container 200.

The flexible container 200 may be any suitable single-use flexible container. Generally, the container 200 is originally provided in a folded and deflated and/or evacuated state in the manner it is received from the manufacturer. The flexible container 200 may be of any size, but the testing methods conducted in accordance with exemplary embodiments are generally most useful with containers having a volume of at least 10 L, typically at least 50 L, and in some embodiments in the range of about 100 L to about 5,000 L, such as about 500 L to about 3,500 L, for example. The container 200 may likewise be of any geometry, although six-walled containers and other three-dimensional containers are particularly suitable. The geometry and volume of a container 200 may depend on the industry in which it will be employed, as well as the particular purpose for which it is being used. These uses include, without limitation, upstream buffer/media prep, bioreactors, fermenters, harvest, downstream separation and purification, and final product packaging.

The flexible container 200 can be constructed of any suitable material, which again may depend largely upon the use for which the container will be employed, but in most cases a single or multi-layer medical grade film is preferred. Exemplary materials include high purity U.S. Pharmacopoeia (USP) Class VI films such as polyethylene, ethyl vinyl acetate, and polypropylene, all by way of example.

The flexible container 200, initially still in its folded form as received from the container manufacturer, is placed inside a tank 400. Any type of tank 400 may be used and is typically constructed of plastic or stainless steel. The tank 400 is generally sized to correspond to the shape and volume of the flexible container 200 when completely filled and provides support for the walls of the container 200 as it expands upon filling. The tank 400 can also act as a protective carrier that may allow the container to be transported or shipped after it has been filled with fluid.

In some embodiments, the tank 400 may be jacketed for heating or cooling to control the temperature of the liquid contents within the container 200. The walls of the tank 400 are generally solid to provide adequate surface area to support the walls of the container 200, although ports may be formed in the tank walls to aid in making connections to or from the container 200. The side and bottom walls of the tank 400 may also have a mesh liner to prevent closing unwanted openings in the container 200.

Once placed within the tank 400, the flexible container 200 is inflated, preferably with air. Inflation provides the dual benefit of pre-inflating the container 200 to remove crinkles that might be present before the heavier liquid is introduced into the container, as well as to assist in testing the integrity of the container 200 to identify possible leaks that might also lead to a failure when the bag is filled.

Furthermore, inflation and testing can advantageously take place in the same location as the subsequent filling (i.e., with the container already situated within the tank where it will be filled). As previously mentioned, there is a hazard of introducing damage to the container associated with handling, including during placement within the tank where it will be filled. Exemplary embodiments provide the additional advantage of ensuring container integrity at the point of use, which is not possible using conventional testing methods. In those cases, the test occurs at one location and the container is then removed from the test site, followed by transporting and installing it in the tank at the filling location, all of which introduce extra handling and the possibility for damage after the container was already tested. Containers tested in accordance with exemplary embodiments can be tested shortly or even immediately prior to filling and because the handling steps of installing the container 200 in the tank 400 occur prior to testing, problems introduced as a result of that handling can be identified.

According to one exemplary embodiment, the inflation is accomplished through the portable flexible container integrity test device 100, which contains a blower 105 and/or is connectable to gas lines that may already be running throughout a facility where the container is being used. In either case, a sterile gas is used to inflate the flexible container to maintain the aseptic nature of the container 200. Preferably, the gas is air. A filter 150 is placed along a conduit 160 that forms part of a gas delivery passage and which connects the flexible container 200 to the portable flexible container integrity test device 100. The filter 150 may be either a one-way or a two-way filter. The filter 150 preferably has an average pore size of at least 0.2 microns or smaller, which is sufficient to render the air sterile based on currently accepted standards. As a result, ordinary air can preferably be used to inflate the container 200 without compromising the aseptic quality of the container's interior.

The container 200 is inflated to a predetermined pressure, which may vary depending on the materials of construction, i.e., the types of films used in container manufacture, including the thicknesses of those films and their elasticity. For example, for containers 200 employing polyethylene as a major constituent and having a thickness in the range of about 0.005 in. to about 0.010 in., the container may be inflated to a predetermined pressure set point in the range of about 7 to about 11 inches of water column. It will be appreciated however, that such sizes and pressure ranges are exemplary only.

Determining whether the set point pressure has been reached may be accomplished through the use of any suitable pressure gauge, but preferably is achieved through the use of a pressure transducer 170 connected directly to the container 200 or more preferably indirectly to the container by being inserted into the gas delivery conduit 160 at a location adjacent the container 200. This may be advantageous by reducing the number of fittings the container has. The conduit 160 may advantageously be configured to connect directly to sampling ports or other standard ports already formed in the flexible container. The pressure transducer 170 is in electronic communication with a programmable logic controller (PLC) 115 as described subsequently in more detail.

After the set point pressure is reached, the pressure transducer 170 measures pressure after a predetermined period of time during which an acceptance test is conducted, which may be referred to as pressure decay, with some loss of pressure ordinarily occurring over that time. If the pressure stays above a predetermined threshold within that predetermined period of time, (i.e., the pressure decay does not reflect a loss low enough to reach the threshold) the integrity of the container 200 is confirmed and it can subsequently be filled with the liquid for which it was intended. Typically, the pressure is periodically or continuously monitored throughout the period set forth for the acceptance test. As a result, if the pressure drops below the predetermined threshold at any point during the predetermined time period, the integrity of the container 200 may be considered suspect and it can be rejected, removed from the tank 400, and another container used in its place. All of this can occur prior to filling the container 200 with expensive or hazardous liquid contents and the possible waste of a portion of the same.

The threshold may be selected based on a variety of factors primarily related to the safety factor desired to be incorporated and the level of assurance that no leaks are present; in some situations a test for gross leaks may be sufficient while in other cases it may be desirable to test for fine leaks, which may use a lower acceptance set point and/or longer test times. In some cases, the acceptance set point may be between 0.5 and 1 inches of water column, more typically in the range of about 0.6 to about 0.8 inches of water column. That is, if the pressure drop from the inflation set point (or following the rest period as described below) is greater than the threshold, the container 200 is deemed to have failed the acceptance test. Again it will be appreciated that the identified set points are exemplary only and that any acceptance set point may be employed.

In one embodiment, a pre-determined rest period takes place intermediate the point at which the inflation set point is reached and the point when the acceptance test begins. This rest period provides time for the gas to settle during which crinkles in the container expand so that the container can approach and/or reach its intended volume. This reduces the likelihood that the net container volume is less than the manufactured volume as a result of the crinkles or other portions that may not completely unfold if the bag had not first been inflated prior to filling. Furthermore, the container can be visually inspected during this time and can be manually manipulated if significant crinkles are identified that for whatever reason do not unfold on their own as a result of the air pressure.

Generally, the rest period can be any desired period of time, although a rest period of at least 30 seconds and less than about 300 seconds is generally preferred to ensure a sufficient rest period is achieved but without allowing so much time to pass that results in loss of efficiency. In some embodiments, the rest period may be in the range of 90 to 180 seconds. As with the inflation and acceptance test set points, these rest period times are exemplary only and any time may be selected.

As the container 200 settles and crinkles unfold during the rest period, the volume of the air inside the container 200 increases, which results in a corresponding drop in pressure. Accordingly, the pressure against which the acceptance set point is evaluated during the acceptance test is the pressure measured by the pressure transducer at the time the rest period expires and the acceptance test begins.

Alternatively, in some embodiments, the pressure drop during settling may be great enough that it is desirable to recharge the container 200 to the inflation set point to expand any additional crinkles that may be left and/or to raise the pressure within the container 200 to ensure that meaningful results are obtained during the acceptance test. Generally, if the rest period results in a loss of pressure of more than about 30%, it is desirable to recharge the container 200 to the inflation set point prior to conducting the acceptance test.

Whether or not a rest period is employed, the acceptance test may be conducted for any desired period of time, although a test period in the range of 120 to 300 seconds is generally satisfactory, and in one embodiment, the acceptance test period is about 150 to about 240 seconds. Again, these times are exemplary only and any times may be employed and may vary depending on a variety of factors, including the volume of the bag under test, as well as the various set points and rest period employed.

Figure 2:
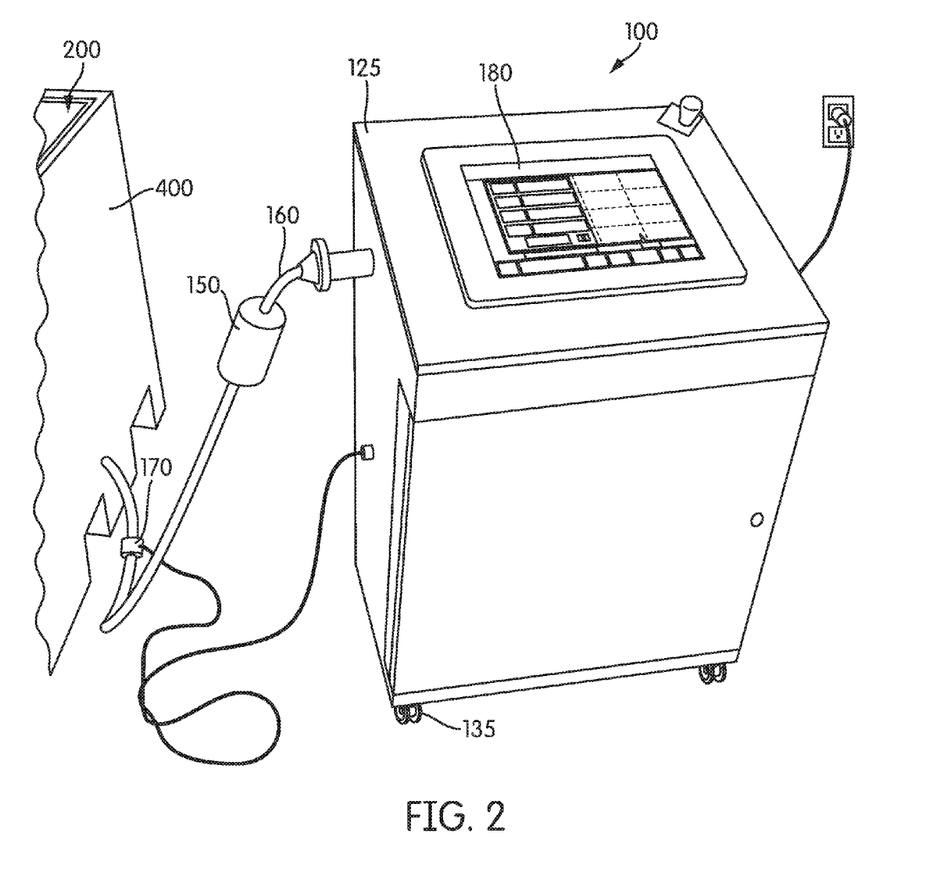
FIG. 2 is a perspective view of the portable flexible container integrity test device in accordance with an exemplary embodiment.
Figure 3:
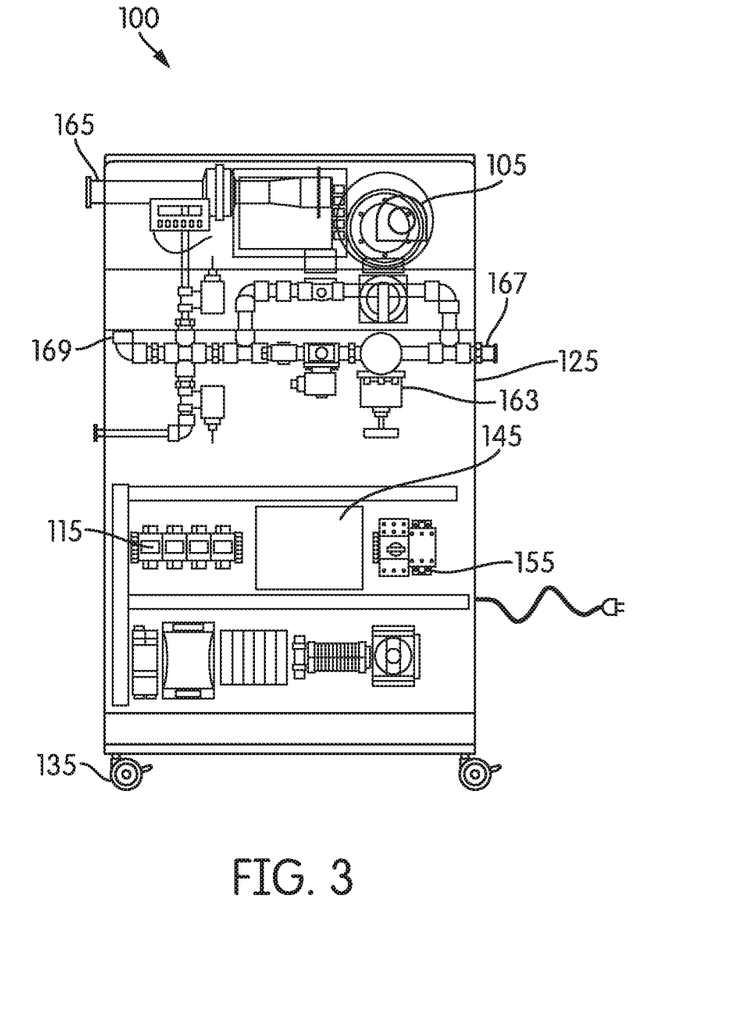
FIG. 3 is a front view of the of the portable flexible container integrity test device with the front housing removed for illustration.

Turning to FIGS. 2 and 3, the portable flexible container integrity test device 100 is illustrated in more detail. The device 100 may conveniently be provided as a self contained unit for ease of portability, being enclosed within a plastic or stainless steel housing 125 supported on casters 135. The device 100 contains the PLC 115 within the housing 125. Any suitable controller that is capable of being programmed to receive and process input and measure and respond thereto may be employed as the PLC. A suitable PLC includes those sold under the Allen-Bradley name available from Rockwell Automation. The PLC 115 and other components of the device 100 requiring electrical power may be powered by a corded connection to a standard A/C outlet. To enhance the portability of the device 100, a battery 145 is preferably contained within the device housing 125 and used to provide the electric power. In such cases, an inverter 155 may also be provided to convert the battery's direct current to alternating current. Optionally, a charger may be provided within the housing 125 or otherwise be connectable to the device 100 so that the battery 145 can be recharged.

The device 100 further includes an internal air passage 165 that together with the gas delivery conduit 160 forms the pathway for delivery of air to inflate the container 200. The internal air passage 165 may be constructed from one or more interconnected conduits. The device 100 preferably contains a blower 105. The blower 105 is in fluid communication with the container 200 via the internal air passage 165 and gas delivery conduit 160. The blower 105 is in electronic communication with the PLC 115 that starts and stops the blower 105 depending upon whether more air is required in the container 200 to reach the predetermined inflation pressure.

The internal air passage 165 may further be constructed so that instead of the air being delivered by the blower 105 contained within the device housing 125, the device 100 could alternatively be connected to an air network within the facility in which the device is being used. This would permit the device 100 to take advantage of so-called "house air" that would reduce the need for blower operation and save battery life by connecting the house air to the device 100 by a house air coupling 167. One or more gauges 163 may be employed along the internal air passageway 165 to manually monitor the flow of air there through.

A vent 169 may be employed at some point along the air pathway, either in the internal air passage 165 or the gas delivery conduit 160, that can be opened, for example, should the blower 105 unexpectedly continue running after the inflation set point has been reached. This can avoid the possibility of damaging the container 200 by over-inflation. The vent 169 can also be used to evacuate air from the container 200 that is displaced by liquid during filling operations.

The device 100 further includes the pressure transducer 170, as previously described. The pressure transducer 170 is placed within the gas delivery conduit 160 and is in electronic communication with the PLC 115 for the measurement and monitoring of air pressure in the container 200. Because the pressure transducer 170 is present on the filtered side of the air sent to the container 200, it should be an aseptic device if being use in an aseptic environment. Preferably, the pressure transducer 170 is a sterile, single-use disposable device, such as the pressure transducers commercially available from Pender-Tech.

The filter 150, pressure transducer 170, and the gas delivery conduit 160 are all preferably single-use disposable items for use in aseptic environments. As a result, these items may conveniently be provided with the container 200, while the components of the device 100 contained within the housing 125 do not need to be maintained in an aseptic condition and thus can be used repeatedly.

A human-machine interface (HMI) 180 provides a user the ability to interact with and control the portable flexible container integrity test device 100 and to cause the test operations to be executed in the desired manner, adjust set-points, and review results, among other things. Preferably, the HMI 180 is a touch screen, although any interface and associated input devices (keyboard, mouse, etc.) that permit interaction with the PLC 115 may be employed.

Optionally, the device 100 may include a printer and/or a network connection to provide output data regarding test results that may be logged and/or linked with the container 200 via a unique identifier for future use or reference.

Using the device 100, the container 200 can be inflated and an integrity test performed on it at the point of use in accordance with exemplary embodiments. This reduces the risk that installation and related manipulation of the empty container 200 will have generated an undetected hole or other flaw; such flaws would have remained undetected if the container 200 had been tested using conventional testing methodologies, such as helium testing. Exemplary embodiments also have the added benefit of reducing or eliminating crinkles that reduce the effective volume of the container 200 to less than its manufactured volume, which can also result in container failure during filling.

Figure 4:
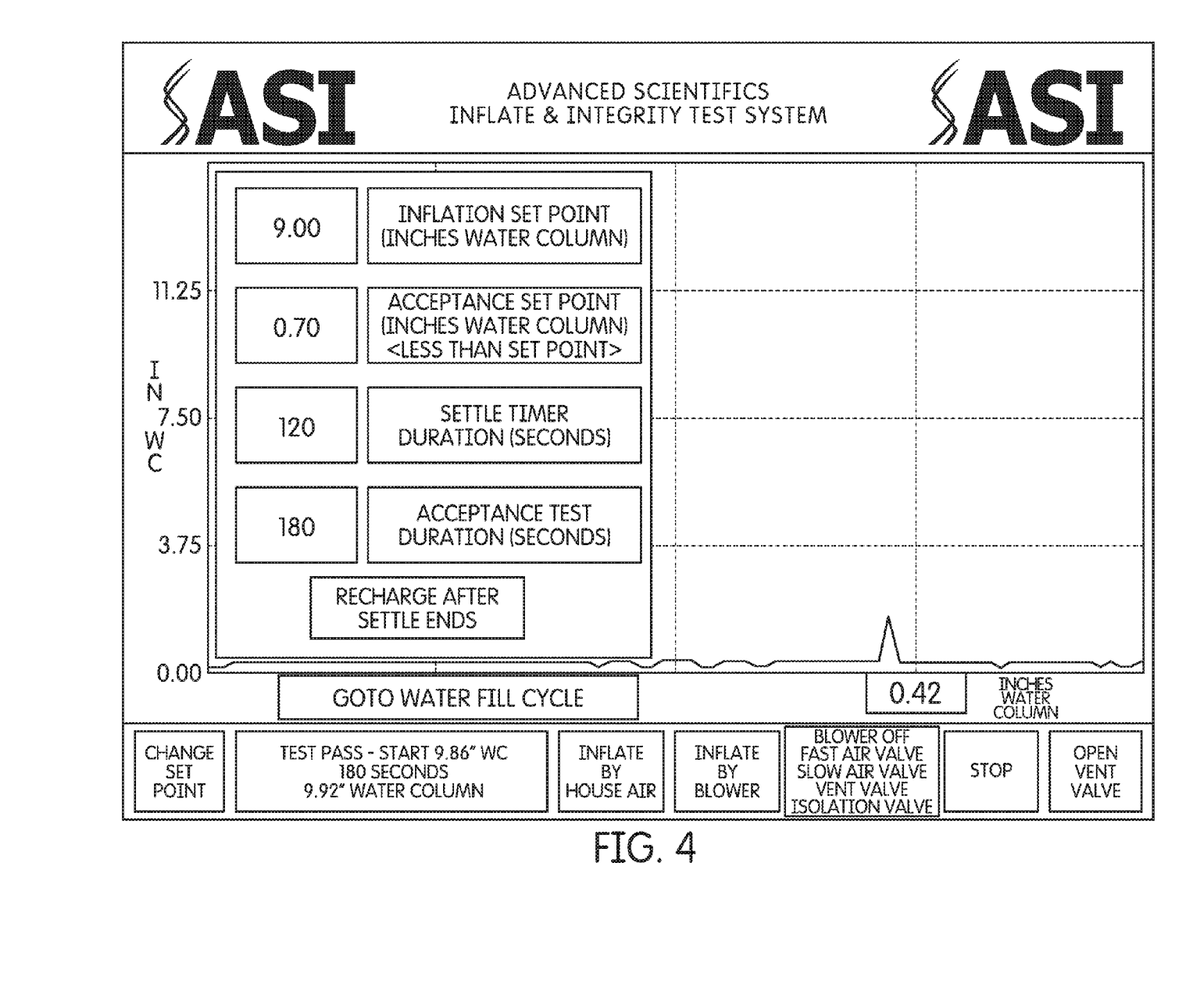
FIG. 4 is an exemplary screen view of the portable flexible container integrity test device for carrying out the test method in accordance with exemplary embodiments.

FIG. 4 illustrates an exemplary screen shot of the HMI 180 that reflects the predetermined inflation set point, acceptance set point, settle time (i.e. rest period) set point, and acceptance test time set point. It further illustrates the device's ability to monitor and graphically display pressure in real-time, along with other device operation functions that can be selected by the touch screen.

Returning to FIG. 1, after the portable flexible container integrity test device 100 has been used to inflate the container 200 and conduct the integrity test, the device 100 can optionally, but advantageously be used as part of the container filling process. The container 200 has a fill port 210 that is configured to be coupled to the pump 300. The pump 300 is preferably a peristaltic pump which is often used to convey liquids in aseptic environments.

As a result of the inflation accomplished by the de-crinkling and integrity testing carried out in accordance with exemplary embodiments, the container 200 has its full or nearly full volume filled by air that must be displaced by the incoming liquid. To maintain an aseptic environment, the container 200 is preferably not vented directly to the atmosphere. Rather the air is directed out through the air passage delivery conduit in the direction opposite that which it entered. This may include passing back through the filter 150 prior to venting so that any external air that is able to re-enter the container 200 during the filling process through the vent 169 must pass through the filter 150 and thus does not compromise the aseptic environment.

However, the gas delivery conduit 160, particularly with the presence of the filter 150 still attached, may have the effect of preventing the air from escaping as fast as the liquid is pumped in. This would have the effect of causing the container 200, formed of a flexible film material, to expand and potentially even to rupture. Accordingly, the portable flexible container integrity test device 100 may remain in electronic communication with the pressure transducer 170 during filling, which allows the device 100 to monitor the inflow of liquid as well as the outflow of air based on the pressure within the container 200. The portable flexible container integrity test device 100 can further be in electronic communication with the pump 300. In the event that the measured pressure indicates an imbalance between inflow and outflow that exceeds a predetermined threshold, the device 100 can control the pump 300 to reduce the rate at which liquid is being introduced or even to pause the pumping until a preset level is reached at which liquid can be introduced again safely into the container.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising:
   inflating a flexible container with a sterile gas until a predetermined pressure set point is reached within the flexible container;
   allowing the sterile gas to settle for a first predetermined period of time after the step of inflating so that there is a pressure drop within the flexible container;
   reinflating the flexible container until the predetermined pressure set point is reached within the flexible container; thereafter
   measuring a subsequent pressure within the flexible container after a second predetermined period of time; and
   comparing the measured subsequent pressure of the flexible container to a predetermined threshold.

2. The method of claim 1, wherein the flexible container is provided before inflating as a folded, deflated flexible container situated in a same tank where the flexible container is subsequently filled with liquid.

3. The method of claim 1, wherein the sterile gas is filtered air.

4. The method of claim 1, wherein the first predetermined period of time is in a range of 60 seconds to 240 seconds.

5. The method of claim 4, wherein the second predetermined period of time is in a range of 60 seconds to 300 seconds.

6. The method of claim 1, wherein the steps of inflating, measuring and comparing are accomplished using a portable test unit having a blower, a power source, and a programmable logic controller contained therein.

7. The method of claim 1, wherein the step of measuring the subsequent pressure within the flexible container is accomplished using a pressure transducer in electronic communication with the flexible container and a programmable logic controller.

8. The method of claim 1, wherein the flexible container is inflated with air passed through a filter having an average pore size of 0.2 microns or smaller.

9. The method of claim 1, wherein the method further comprises filling the flexible container with a liquid after the step of comparing.

10. The method of claim 1, wherein the step of measuring the subsequent pressure within the flexible container further comprises monitoring the pressure during the second predetermined period of time.

11. The method of claim 10, wherein if the pressure during monitoring falls below the predetermined threshold, the flexible container is rejected.

12. The method of claim 1, wherein the predetermined pressure set point is 7 to 11 inches of water column.

13. The method of claim 1, further comprising exhausting at least a portion of the sterile gas from the flexible container through a filter.

14. The method of claim 13, further comprising measuring a gas pressure within the flexible container while exhausting the at least a portion of the sterile gas through the filter.

15. The method of claim 1, wherein the step of reinflating the flexible container occurs after there is a reduction in the pressure in the flexible container of greater than 30%.

16. A method comprising:
inflating a flexible container with a sterile gas until a predetermined pressure set point is reached within the flexible container;
allowing the sterile gas to settle to settle for a first predetermined period of time after the step of inflating;
wherein after the first predetermined period of time for settling there is a reduction in the pressure of greater than 30%, then reinflating the flexible container until the predetermined pressure set point is reached within the flexible container; thereafter,
measuring a subsequent pressure within the flexible container after a second predetermined period of time; and
comparing the measured subsequent pressure of the flexible container to a predetermined threshold.

17. The method of claim 16, further comprising exhausting at least a portion of the sterile gas from the flexible container through a filter.

18. The method of claim 17, further comprising measuring a gas pressure within the flexible container while exhausting the at least a portion of the sterile gas through the filter.

19. The method of claim 16, wherein the predetermined pressure set point is between 7 to 11 inches of water column.

* * * * *